Jan. 28, 1941.   A. F. WILLIAMS   2,229,994
SPECTACLES
Filed June 21, 1938
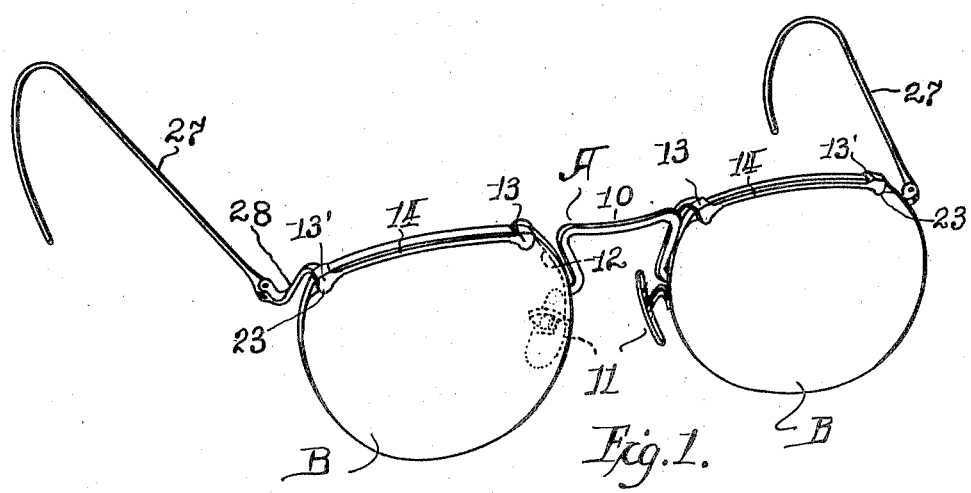
Fig. 1.
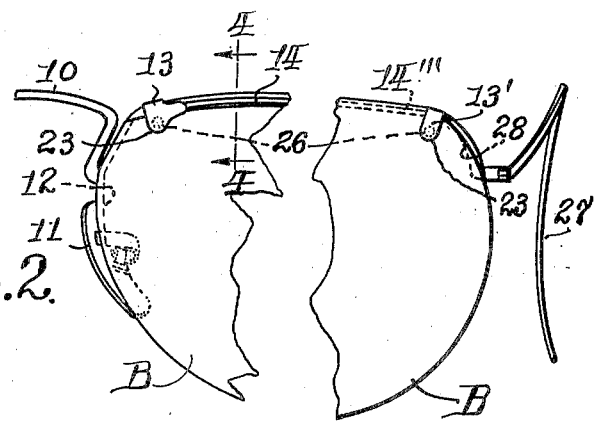
Fig. 2.
Fig. 3.
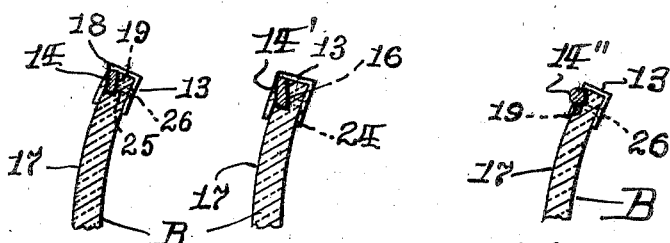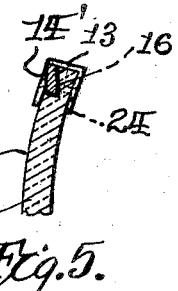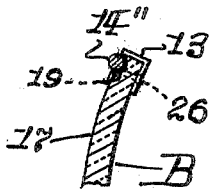
Fig. 4.   Fig. 5.   Fig. 6.
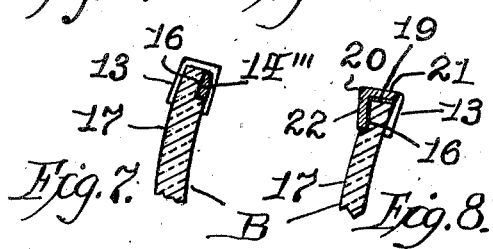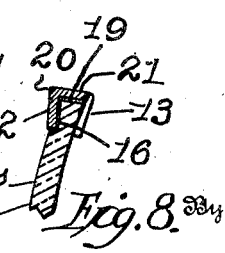
Fig. 7.   Fig. 8.
Inventor
Arthur F. Williams
By: Howard F. Fischer
Attorney Patented Jan. 28, 1941

2,229,994

UNITED STATES PATENT OFFICE 2,229,994

SPECTACLES

Arthur F. Williams, St. Paul, Minn., assignor to Wils-Edge Corporation, St. Paul, Minn., a corporation of Minnesota Application June 21, 1938, Serial No. 214,911

3 Claims. (Cl. 88—47)

This invention relates to spectacles where the lenses may be supported by light-weight frame means which engage the lens at a marginal portion thereof to firmly support the same.

It is a feature to provide a spectacle or eyeglass frame wherein the lens may be supported at the top and be provided with holes which pass through the lenses, the holes being spaced apart and closely positioned in the margin of the lens and preferably in that portion of the lens which follows the eyebrow of the wearer. The lens is formed with a marginal groove on one side in which a bar of the spectacle frame is adapted to engage, the bar acting as a spacing and supporting means for the channel clip portions of the frame which engage over the edge of the lens and in which the holes are provided for receiving the locking means which pass through the holes in the lens to assist in locking the frame to the lens.

It is a feature to provide eyeglasses with toric lenses and where the peripheral edge of the lens is arcuated along the top to follow the contour of the eyebrow of the person wearing the eyeglasses and to marginally groove on one side that portion of the lens following the eyebrow. The lens grooved in this manner is adapted to be held by a frame means having a flat bar or rod-like portion which fits into the groove and which is adapted to connect channel or clip portions to hold the same spaced apart and in position to engage over a marginal portion of the lens.

A further feature resides in providing spectacles wherein spaced apart channel clips which engage over a small portion of the marginal edge of the lenses to be supported in the frames, are held by a bar-, rod-, or channel bar-like marginal frame portion which extends along the marginal edge of a portion of the lens and which has a portion thereof embedded in a complemental groove formed in the marginal edge of the lens.

My invention includes the method of making complete spectacles which consists in providing a spectacle frame having nose pads and bridge means, a short channel clip supporting the nose and bridge means, a light-weight bar or angular marginal frame portion with an outer short channel clip means adapted to support the temple supporting arms where they are used, each clip having holes for receiving locking pins which extend through the lenses, and marginally grooving the toric lens in a compound curve to receive the marginal portion of the frame which holds the clips spaced apart. My method further includes marginally grooving toric spectacle lenses along the outer or inner surface of the lens along a portion of the margin thereof.

It is also a feature to provide spectacles where the lenses are grooved marginally and that portion of the frame fitting in said groove is backed up by or cemented in the groove. This provides a cushion for the portion of the frame which fits into the groove between the frame and the lens and also seals the portion back of the frame against an accumulation of dirt or dust between the lens and the frame portion.

A further feature of my invention resides in eyeglasses wherein holes may be made in the lenses at spaced apart positions namely, at the beginning of the eyebrow adjacent the nose, and at the end of the eyebrow adjacent the temple, and providing short frame channel clips which fit over the lens and holes therein, with locking rivets extending through the lenses and clips to secure the lenses firmly to the clips, and providing a spacing bar means, either of a rod or angular nature, which forms an integral part of the frame with said clips and spaces them apart and which is adapted to extend marginally along the lenses between the clips.

The details and features will be more fully and clearly set forth, together with other objects of my invention.

In the drawing forming a part of this specification:

Figure 1 is a perspective view of my spectacles as they would appear in one form with the attached temple bows.

Figure 2 is an enlarged detail of a portion of a lense and frame, looking toward the front of the lens.

Figure 3 is a front view of another form of my spectacle frame, where the marginal connecting frame member extends along the back of the upper margin of the lens, showing only a portion of the lens.

Figure 4 is a section of a portion of a lens and through that portion of the frame which extends in the groove or across the face of the lens at the margin thereof on the line 4—4 of Figure 2.

Figure 5 is a similar section with a different frame portion.

Figure 6 is a detail section of another form of my frame.

Figure 7 is a sectional detail of still another form of the frame.

Figure 8 also illustrates a detail section of a portion of the lens, illustrating another form of the frame of my eyeglasses.

My spectacles A are of a light-weight construction, having a rimless nature, and are provided with a bridge portion 10 which holds the nose pads 11 spaced apart so as to fit on either side of the nose. The nose pads 11 are supported to the bridge by the arms 12 which extend along the back of the margin of the lenses B so as to follow the contour of the margin of the lenses.

The frame portion which is adapted to support the lenses B of the eyeglasses A, includes a pair of spaced apart short channel inner clips 13 and outer clips 13', which are held spaced apart and connected by the marginal frame member 14. The frame member 14 may be formed with an inner angular surface which is adapted to fit into a marginal semi-dove-tailed groove 16 formed in the outer face 17 in the lens B. The outer surface of the frame member 14 may be formed with a curved outer face 18, which may be engraved or suitably decorated if it is desired. This surface 18 may project beyond the outer surface 17 of the lens B as illustrated in Figure 4.

The frame member connecting the clips 13 and 13' may be formed with a flat bar-like formation 14' fitting into the groove 16 as illustrated in Figure 5. The bar portions 14 or 14' may be backed up with cement 19 between the bar and the lens which will cement the bar to the glass of the lens and also cushion the bar to the lens as well as filling the space behind the bar so that there will be no accumulation of dust or dirt.

In Figure 6 I have illustrated a round rod-like form 14'' of the frame member, which connects the clips 13 and 13'. In Figures 1, 2, 4, 5, and 6, the frame member 14, 14' and 14'' extends along the margin or outer front surface of the lens B.

In Figure 7 I have illustrated a marginal frame member 14''' which fits in a marginal groove extending along the inner surface of the margin of the lens.

I have illustrated in Figure 8 a frame member 20 which holds the clips 13 and 13' spaced apart and which frame portion is angular or right-angular in cross-sectional shape and which is provided with the portion 21 extending over the top periphery or edge of the lens, whereas, a depending frame portion 22 fits into the groove 16 in a manner to engage the lens. The angular frame member 20 only extends between the clips 13 and 13'.

Figure 3 shows the frame portion 14''' positioned on the back surface of the upper margin of the lens. In this construction the frame member 14''' is positioned on the back surface of the lenses of the spectacles and does not prominently appear as in the construction where the member 14 runs along the front surface of the lens. Where the spectacles are made with the frame member 14''' extending along the back of the lens B, the clip 13' is of small dimensions and neat appearance, as illustrated in Figure 3. Further, the attachment of the frame by the clips 13 and 13' and the rivets securing the same to the lenses, is placed as high as possible in the lens or as close to the edge of the lens as possible, so as not to obstruct the vision of the wearer of the spectacles. With my spectacles, the lenses B are held along the top periphery of the same, and by means of the member 14, additional gripping means are provided for gripping the lenses, making it unnecessary to have the clips 13 as large as has been necessary heretofore in former types of spectacle frames.

In my spectacles the mounting of the lenses is high above the line of vision or at the eyebrow portion of the lens so that the means for securing the lenses to the spectacle frames is out of the ordinary line of vision of the wearer. This is an important feature of my spectacles. By this means I obtain the greatest possible area of clear vision through the lens.

It is therefore apparent that the spectacle frames A, provided and constructed as herein set forth, provide a very light-weight, strong frame for supporting the lenses B. The spectacles A may be made of any of the structures herein defined, with the frame portions 14 formed of any of the styles or shapes defined as well as the angular frame portion 20, which portions are adapted to support the clips 13 and 13', properly spaced apart and connected together by a light-weight frame portion.

It is desirable to provide the groove 16 in the glass which may extend marginally along either the front or the back of the glass so as to provide an additional supporting means for the frame portions, such as 14. The clips 13 and 13' are provided with depending portions 23, having holes 24 formed in the same. The lenses B are also formed with complemental holes 25 so that a rivet 26 may be passed through the hole 25 in the lens, and through the holes 24 in the depending portions 23, and the rivet sealed to lock the lens B to the frame portions of the spectacles A. The rivets 26 may be of any suitable form, such as a soft fuseable type which may be readily fused and sealed in place, or they may be of a screw type, or of any other suitable form which is adapted to pass through holes in the lens to hold the same.

In my spectacles, I provide the holes through the lenses which are adapted to receive suitable rivets together with the clips having holes to receive the rivets and the means for connecting the clips by a light-weight frame portion. The connecting means for the clips, such as 14, when embedded in a groove such as 16, is inconspicuous owing to its nature and it following the marginal edge of the lens.

Where temple bows 27 are used in my spectacles, they are adapted to be supported by the arms 28 which are secured to the back of the clips 13' and which extend in line with the outer periphery of the lens B in the same manner as the arms 12 are extended from the clips 13. When the spectacles are made without the temple bows, the bridge portion 10 may be made of a spring material so as to provide the necessary spring means for holding the spectacles to the nose of the wearer and the spring may be attached directly to the arms 12 or the clip portion 13, to complete the frame of the spectacles in this form.

When the lenses B are formed with the marginal groove 16 and the frames are provided with the member 14 which connects the clips 13 and 13', it may not be necessary in certain forms of my eyeglasses to form the holes 25 in the lenses, but the clips and frame portions may be cemented in place so as to hold the lenses B firmly in the frames. When the frame A is made in this manner, where it is not desired to form holes in the lenses B, the clips 13 and 13' may be made smaller so as to give a U-shaped engagement on either side of the lens at the ends of the frame portions 14. Thus it is apparent that it is not necessary to secure the lenses by rivets passing through holes when the lenses are marginally grooved to receive the frame portions 14. The clips 13 and 13' may be of a spring nature so as to frictionally and resiliently engage on either side of the lenses B with sufficient tension to hold the lenses B secured to the frame portions of the spectacles.

I claim:

1. Spectacles including frame means for supporting lenses having a frame portion extending along the eyebrow, said frame engaging one lens surface, a pair of lenses having opposed faces and a connecting edge, a groove in a face of the lens in which said frame portion extends, cementing means between said frame portion and the lens in the groove to anchor the frame portion therein, and short channel rivet clips positioned at each end of said frame portion and adapted to engage over the edge of the lens in a manner to receive the ends of rivets extending through the lens to further anchor the lens to the frame.

2. Spectacles comprising a pair of lenses, marginal grooves formed in a face of said lenses, a marginal frame portion adapted to lie in said marginal grooves in said lenses engaging only one side of said lens, U-shaped marginal clips integrally connected to the ends of said frame portions, and bridge and temple bow means connected integrally to said clips.

3. Eyeglasses comprising a pair of lenses, a groove in one face of each lens along a portion of the periphery thereof, a frame including a pair of lens supporting portions, each portion including spaced lens engaging clips, and a connecting bar lying in said groove adjacent to, but not overlying the lens edge along said portion of the lens periphery.

ARTHUR F. WILLIAMS.